United States Patent
Candela et al.

(10) Patent No.: US 7,418,156 B1
(45) Date of Patent: Aug. 26, 2008

(54) DOMAIN OF DEFINITION IN WARPER/MORPHER

(75) Inventors: Dan Candela, Beverly Hills, CA (US); Mitch Middler, Hermosa Beach, CA (US); Ron Brinkmann, Hermosa Beach, CA (US); George Wolberg, Woodmere, NY (US)

(73) Assignee: Apple Inc., Cupertino, CA (US)

( * ) Notice: Subject to any disclaimer, the term of this patent is extended or adjusted under 35 U.S.C. 154(b) by 838 days.

(21) Appl. No.: 10/825,847

(22) Filed: Apr. 16, 2004

(51) Int. Cl.
*G06K 9/36* (2006.01)

(52) U.S. Cl. ............... 382/276; 382/241; 382/302; 704/215

(58) Field of Classification Search ............ 382/106, 382/117, 289, 291, 190, 100, 169, 176, 209, 382/236, 243, 248, 250, 302; 345/345, 622, 345/629, 589–591; 348/416, 745–747, 807, 348/416.1; 764/203, 269
See application file for complete search history.

(56) References Cited

U.S. PATENT DOCUMENTS

| 5,067,014 A | * | 11/1991 | Bergen et al. ............ 382/107 |
| 5,175,808 A | * | 12/1992 | Sayre ..................... 345/647 |
| 5,204,944 A | * | 4/1993 | Wolberg et al. .......... 345/427 |
| 5,321,770 A | * | 6/1994 | Huttenlocher et al. ..... 382/174 |

* cited by examiner

*Primary Examiner*—Samir A. Ahmed
*Assistant Examiner*—Mehdi Rashidian
(74) *Attorney, Agent, or Firm*—Fenwick & West LLP

(57) ABSTRACT

An efficient way to perform rendering operations in an image processing environment includes a warping engine having a warping module and a domain of definition (DOD) module. When an object is warped, a new DOD for the image is determined by the warping engine by comparing the location of certain pixels in the warped image with their corresponding locations in the original image. By maintaining a DOD for the warped images, only that portion of the DOD that intersects with a region of interest is computed, thus resulting in optimized performance.

21 Claims, 5 Drawing Sheets

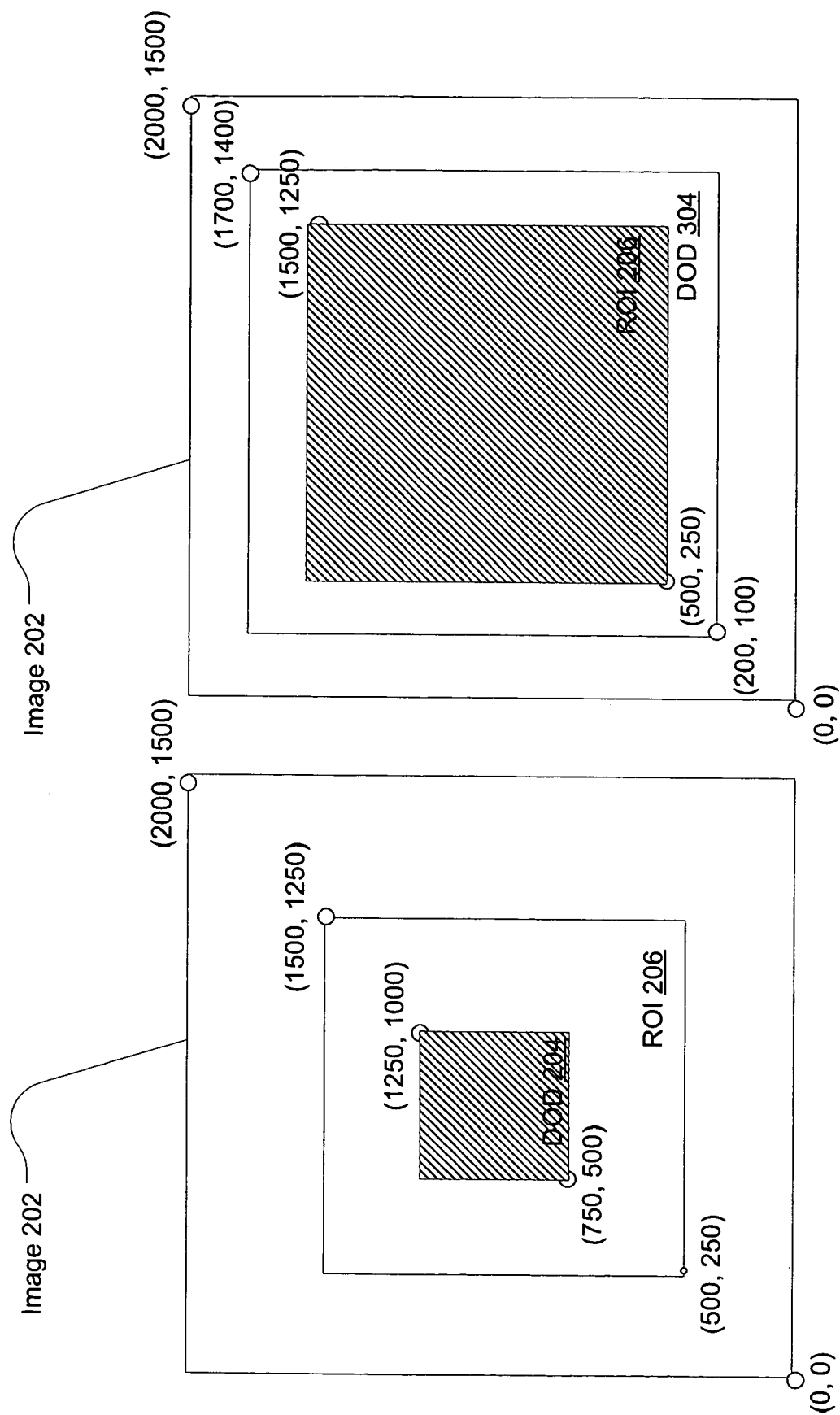

DOMAIN OF DEFINITION IN WARPER/MORPHER

BACKGROUND OF THE INVENTION

1. Field of the Invention

The present invention relates generally to image processing using a computer system. In particular, the present invention is directed to a system and method for warping pixels from one location to another in a computer graphics environment.

2. Description of the Related Art

In the image processing arts, there is often a need to alter an image such that it appears to transform over time into another image. This effect is commonly referred to as "warping". Given an image, an artist can create a source set of splines and a destination set of splines. As is known by those of skill in the art, a spline is a curve described by a point location, tangent length and tangent direction. A series of points around an object can follow the object quite closely, thus allowing it to be manipulated. Warping technology allows an image to be transformed from a first image to a second image by interpolating the pictures between the two splines.

For example, given a circle that is to be changed into a square, a spline around a circle is the source and around a square is the target. For each intermediate step between the two images, a warping algorithm calculates where the individual pixels within the frame should move to reach a final destination.

A morphing process is a specialized type of a warp in which the initial image and final image warp towards and dissolve into each other. As another example, to morph an adult face into a baby face, an artist might draw a set of splines around the adult's eyes, nose, mouth, ears, hairline, and jaw line; and then create corresponding sets of spline curves around the baby's features; the morph takes those pixels and changes their location from the adult's location to the baby's location, creating a scrunched-up face.

Alternatively, a warping operation can cause an image to grow—for example, if the baby's picture described above were warped into an adult face. However, if part of the image is moved outside of the visible window area, changes to the non-visible image are lost. In subsequent operations, if those areas are brought back into frame they are black and contain no image data. Conventional warper algorithms do not keep track of the image regions that are being warped. Consequently, if a warping or morphing process is applied to an image causing the image to move outside of the viewable window, it is no longer calculated as part of the image.

One conventional work-around to this problem has been to set the viewing area to be very large, in order to encompass any potential expansion of the image. However, this requires that enough resources such as RAM and processing power be available to render all of an image all of the time, even if it is not being displayed.

Accordingly, there is a need for a system and method for improved warping in an image processing and compositing environment.

SUMMARY OF THE INVENTION

The present invention enables an efficient way to perform rendering operations in an image processing environment. A warping engine includes a warping module and a domain of definition (DOD) module. The DOD associated with an image is a preferably rectangular subregion of an image outside of which there is no non-background related information. When an object is warped, a new DOD for the image is determined by the warping engine by comparing the location of certain pixels in the warped image with their corresponding locations in the original image. By maintaining a DOD for the warped images, only that portion of the DOD that intersects with a region of interest is computed, thus resulting in optimized performance.

BRIEF DESCRIPTION OF THE DRAWINGS

FIG. 2 and FIG. 3 illustrate the concept of a Domain of Definition (DOD).

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
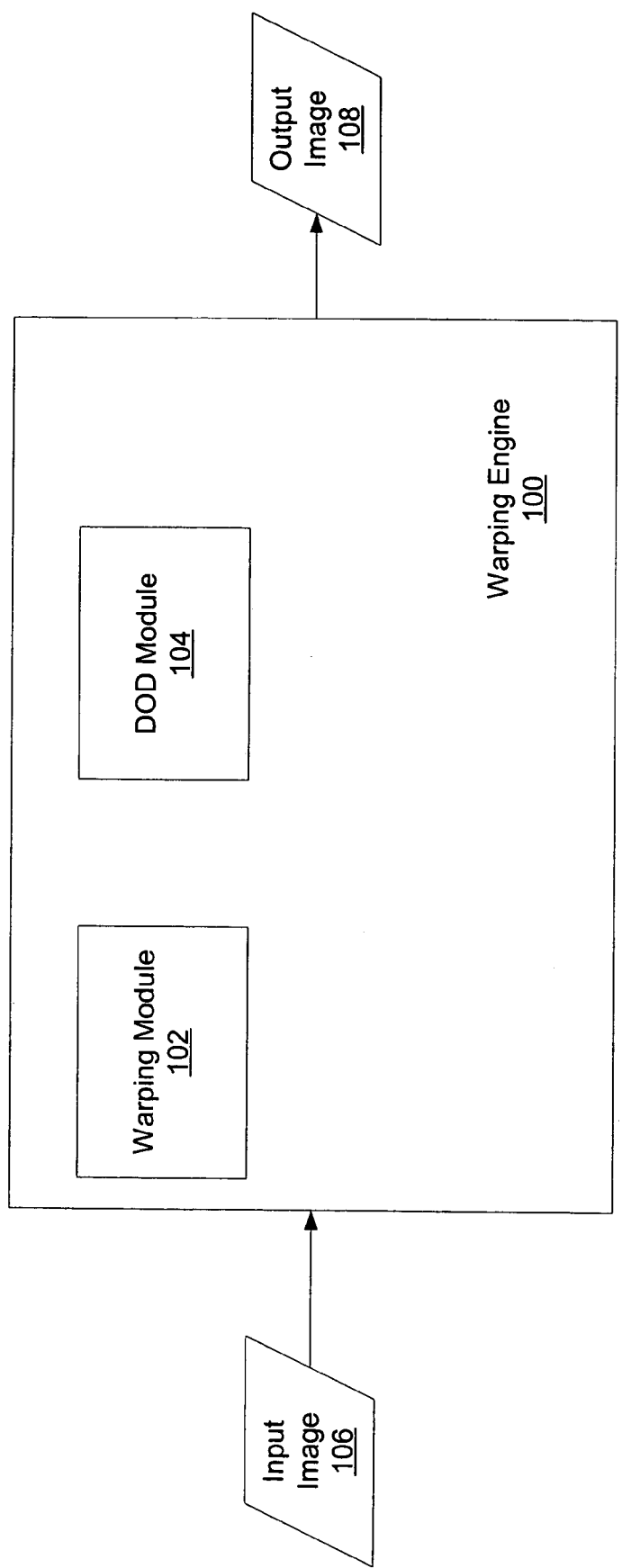
FIG. 1 is a block diagram illustrating a system in accordance with an embodiment of the present invention.

Referring now to FIG. 1 there is shown a block diagram illustrating an embodiment of the present invention. As illustrated in FIG. 1, a warping engine 100 includes a warping module 102 and Domain of Definition (DOD) module 104. Images to be warped are received by warping engine 100. Warping module 102 includes logic to actually solve the warp, and DOD module 104 includes logic to determine a modified DOD applicable to the warped image. This functionality is described further below with respects to FIGS. 2-10. Also shown in FIG. 1 are input image 106 and output image 108.

Warping engine 100 employs Region of Interest (ROI) and Domain of Definition (DOD) paradigms to provide highly efficient image processing. The ROI of an image is a preferably rectangular region of the image that is of interest to the viewer. The DOD is a preferably rectangular region that defines the maximum boundaries of useful information in an image. Generally, for channels of the image located outside of the DOD, values will be 0. Unlike a region of interest, a DOD is preferably determined automatically. By limiting image processing based on the dimensions of the ROI and DOD, warping engine 100 can optimize processing and memory requirements.

For example, referring now to FIG. 2, there is shown an image 202 and a DOD 204 within the image. Also shown is a ROI 206. In the illustrated example, the image 202 is a 2000× 1500 pixel image, with a DOD of 500×500 pixels. Because the ROI is larger than the DOD in this case, all of the DOD is visible to a user. Suppose that the DOD 204 is filled by a 500×500 pixel object that will be resized to be a 1500×1150 pixel image, which will be too big for the ROI—that is, the entire DOD will not be visible at once. As is known by those of skill in the art, it is preferable then not to expensively calculate the entire 1500×1150 pixel object, but rather to calculate only the subset of the object that will remain within the ROI.

This is illustrated in FIG. 3, where DOD 304 has now grown to be a 1500×1150 region. ROI is still of the same size (1000×1000 pixels) as in FIG. 2, which means that the ROI is too small to display the entire image, and the part of the DOD outside of the ROI is therefore not computed.

As noted above, image warping is the repositioning of pixels based on transforms that modify the configuration of the image. Warping engine 100 provides warping functionality by allowing the user to specify some constraints that the warping solution must satisfy. For example the user may, by drawing shapes within the user interface, tell warping engine 100 to move a pixel that is currently located at position (100,100) in the image to location (200,200). Warping engine 100 then determines how to move all other unconstrained pixels within the image in order to produce a result. In this case, perhaps pixel (100,101) will be relocated to (200,201) based on the user defined input.

Figure 5:
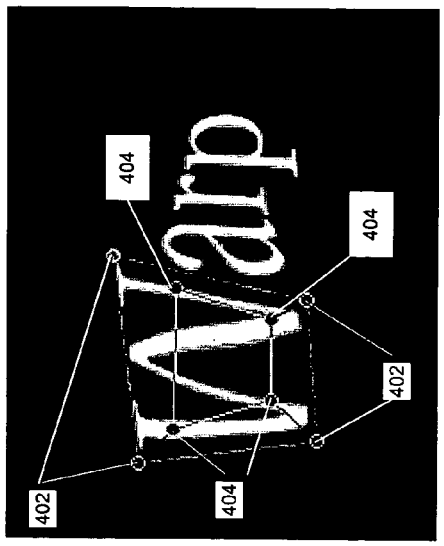
FIG. 5 illustrates a warped image in accordance with an embodiment of the present invention.
Figure 4:
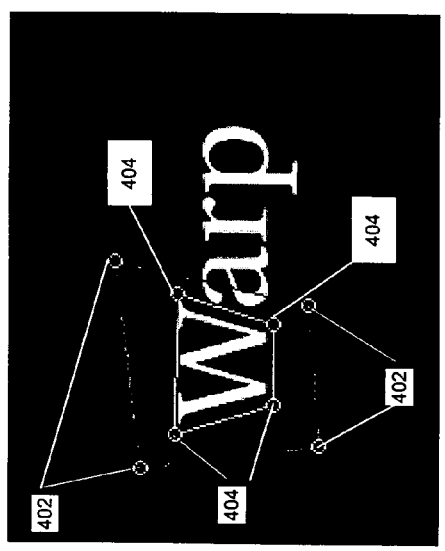
FIG. 4 illustrates an image to be warped in accordance with an embodiment of the present invention.

FIG. 4 illustrates an example of constraints including a source location 404 and destination location 402. That is, the user has specified that the "W" in the word "Warp" should be warped from its original position, as indicated by the splines 404 to a new position, indicated by splines 402. The result of the warp is illustrated in FIG. 5.

Figure 6:
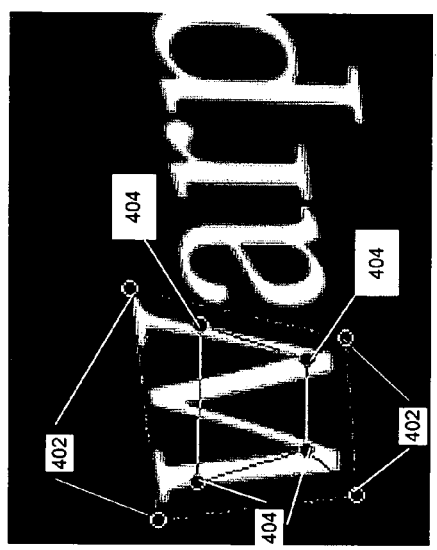
FIG. 6 illustrates a warped image in accordance with an embodiment of the present invention.

Using warping engine 100, a user preferably has the option of having a default constraint placed on the image warp; the user can choose to have pixels along the edge of the image remain fixed or to move freely. In the warp illustrated in FIG. 4 and FIG. 5, the image border is fixed. However, if the same warp is applied to FIG. 4 without a border constraint, the resulting warp is different, as illustrated in FIG. 6.

In using free-form image warping as described above, it is non-trivial to determine a DOD, because there are an arbitrary number of constraints, often pulling the image in conflicting directions. The present invention uses two approaches, depending on whether pixels are to remain fixed at the image border, to accurately determine the DOD for such warps.

Figures 7, 9:
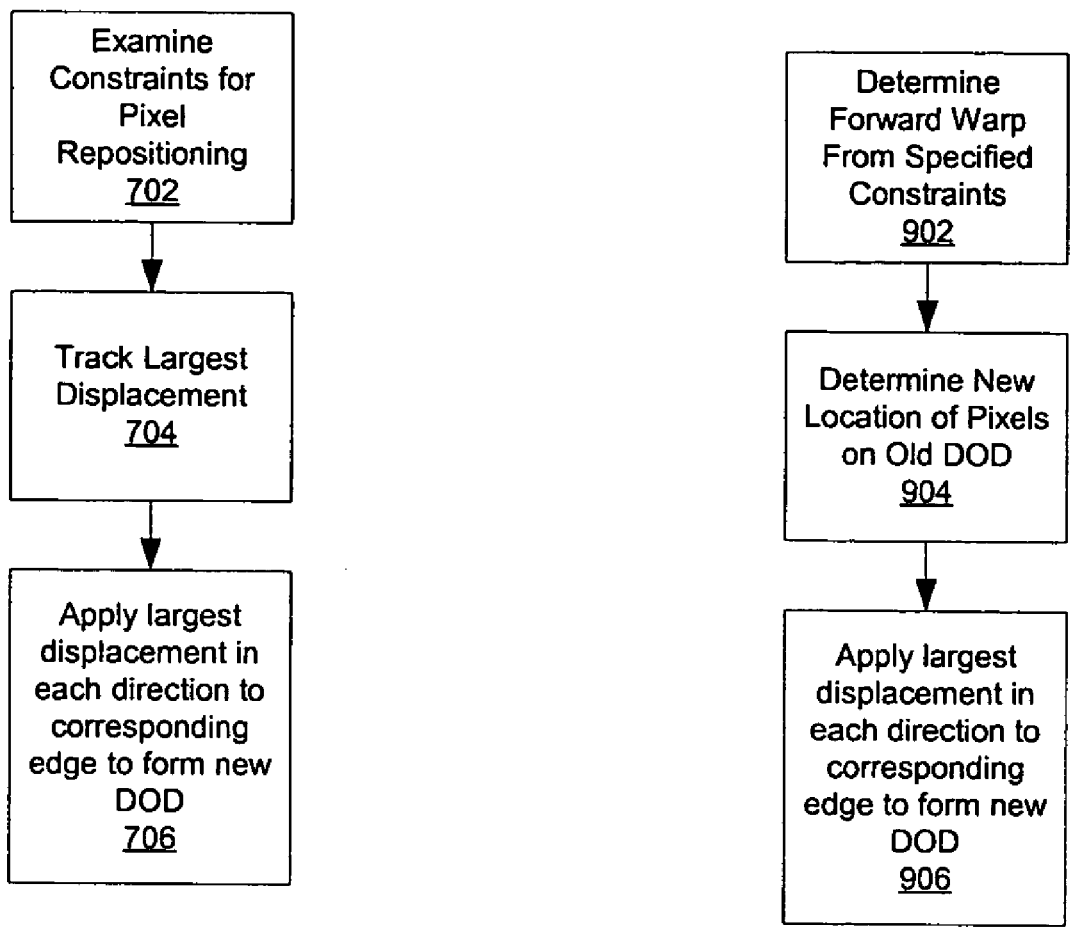
FIG. 7 is a flow chart of a method for warping images in accordance with an embodiment of the present invention.
FIG. 9 is a flow chart of a method for warping images in accordance with an embodiment of the present invention.

Referring now to FIG. 7, there is shown a flow chart of a method for determining a new DOD formed as a result of a warping operation in which pixels are fixed at the image border.

First, warping engine 100 examines 702 each of the user-defined constraints for pixel repositioning. By analyzing each constraint, warping engine 100 can keep track 704 of the largest displacement in each direction—up, down, left, and right—caused by the warp. After the largest displacement in each direction is determined, the displacement is then applied 706 to each of the corresponding edges of the original DOD rectangle to obtain a new DOD.

Figure 8:
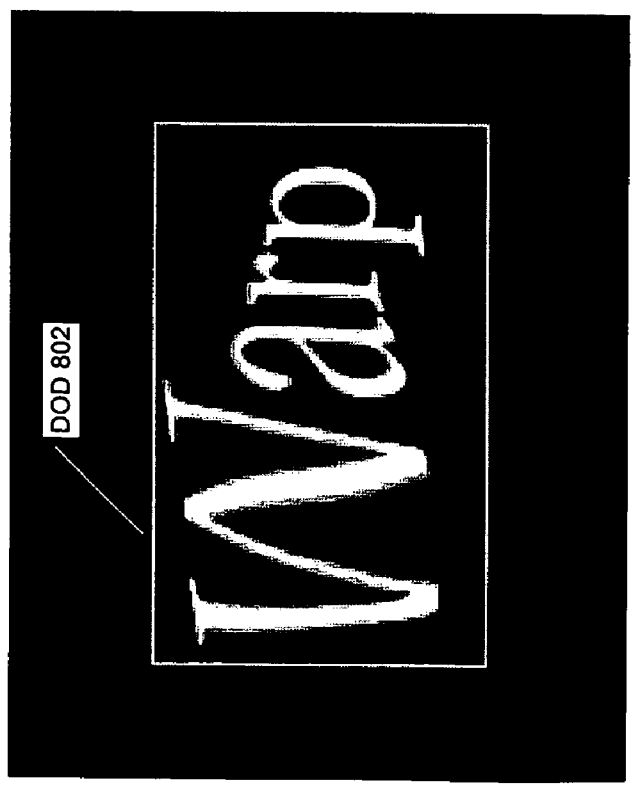
FIG. 8 illustrates a DOD determined according to an embodiment of the present invention.

FIG. 8 provides an illustration of a DOD 802 obtained by using the method described above in conjunction with the image in FIG. 4.

In order to avoid wasting resources by unnecessarily rendering more of the image than will actually be viewed, the DOD of the image after warping should be determined. FIG. 9 illustrates a flow chart of a method for determining a new DOD formed as a result of a warping operation in which pixels are not fixed at the image border.

First, warping engine 100 determines 902 a forward warp resulting from the specified constraints. In a preferred embodiment, after warping engine 100 determines the forward warp there is a rectangular grid that specifies where each pixel in the image gets warped to.

For example, in one embodiment a mapping logically connects the following points:

(0, 0) goes to (10,10)
(1, 0) goes to (11, 10)
(2, 0) goes to (12, 10)

etc., where (x, y) refers to the pixel location at distance x from the left side of the image and y from the bottom of the image; (0, 0) being the lower left corner of the image.

To determine the new DOD, warping engine 100 examines the resulting pixel mapping grid at all points falling along the original rectangular DOD to determine 904 their new position after warping. For example, if the old DOD has lower left of (10, 10) and upper right of (100,100), then the top edge of the old DOD is a line from (10,100) to (100,100). By examining the new location of each pixel originally located on that line, warping engine 100 can determine 906 the top edge of the new DOD. For example, assume that the corner points at (10, 100) and (100, 100) did not move at all, but the pixel halfway along the line at (55, 100) is relocated to (55, 120). By looking at every pixel along the old DOD top line, warping engine 100 determines that the maximum in the "up" (y) direction is now 120. Accordingly, warping engine 100 locates the top of the new DOD at position 120.

A similar analysis allows warping engine 100 to determine 906 the left, right and bottom edges of the new DOD. Thus, in a preferred embodiment, the maximum x, y of all of the points determine the upper right boundary of the new DOD and the minimum x, y determine the lower left.

In one embodiment, because computing a forward warp solution can be time consuming, warping engine 100 uses a low-resolution proxy image to determine the new DOD. Image dimensions and constraints are all scaled when using the low-resolution proxy.

Figure 10:
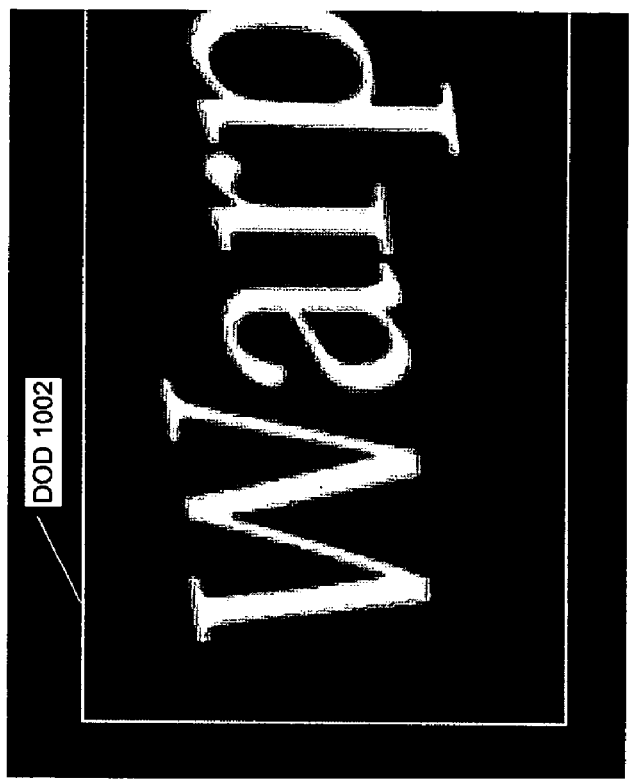
FIG. 10 illustrates a DOD determined according to an embodiment of the present invention.

FIG. 10 provides an illustration of a DOD 1002 obtained by using the method described above in conjunction with the image in FIG. 4.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the warping module and so forth may be provided in many or one module.

Some portions of the above description present the feature of the present invention in terms of algorithms and symbolic representations of operations on information. These algorithmic descriptions and representations are the means used by those skilled in the image processing arts to most effectively convey the substance of their work to others skilled in the art. These operations, while described functionally or logically, are understood to be implemented by computer programs.

Furthermore, it has also proven convenient at times, to refer to these arrangements of operations as modules or code devices, without loss of generality.

It should be borne in mind, however, that all of these and similar terms are to be associated with the appropriate physical quantifies and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A method for determining a domain of definition (DOD) in a warped image, the warped image formed from an original image, each pixel of the warped image having a displacement from a corresponding pixel in the original image, the original image unrestricted by a border, the method comprising:
   determining an original DOD associated with the original image, the original DOD comprising a region of the original image with a boundary surrounding useful information, the boundary having a plurality of edges corresponding to a plurality of directions;
   for each pixel located on the plurality of edges of the original DOD:
      determining a location of a corresponding pixel in the warped image; and
      determining a displacement of the pixel in the warped image from its corresponding pixel in the original image;
   for each of the plurality of edges, determining a maximal displacement value of a pixel on the edge in the direction corresponding to the edge; and
   determining a new DOD for the warped image, the new DOD for the warped image corresponding to a DOD in the original image, each edge of the new DOD displaced in the direction and by the determined maximal displacement value corresponding to the edge of the original DOD.

2. The method of claim 1 wherein the plurality of directions includes up, down, left and right.

3. The method of claim 1, further comprising:
   displaying a first portion of the new DOD within a first region of interest, the first region of interest comprising a viewable window of the warped image.

4. The method of claim 3, further comprising:
   displaying a second portion of the new DOD within a second region of interest, the second portion of the new DOD residing outside of the first region of interest.

5. The method of claim 1, wherein the original DOD and the new DOD are rectangular.

6. The method of claim 1, wherein determining the new DOD further comprises determining a forward warp using a low-resolution proxy image of the original image.

7. The method of claim 1, wherein the warping operation comprises a morphing operation.

8. A method for determining a domain of definition (DOD) formed as a result of a warping operation of an original image, the method comprising:
   determining an original DOD associated with the original image, the original DOD comprising a region of the original image with a boundary surrounding useful information prior to the warping operation, the boundary having a plurality of edges corresponding to a plurality of directions, the warping operation constrained by pixels being fixed at image borders;
   determining a maximum displacement in each of the plurality of directions based on constraints for pixel repositioning in the warping operation; and
   determining a new DOD by displacing each edge of the original DOD boundary by the determined maximum displacement in the direction corresponding to each edge.

9. The method of claim 8 wherein the plurality of directions includes up, down, left and right.

10. The method of claim 8, further comprising:
    displaying a first portion of the new DOD within a first region of interest, the first region of interest comprising a viewable window of the warped image.

11. The method of claim 10, further comprising:
    displaying a second portion of the new DOD within a second region of interest, the second portion of the new DOD residing outside of the first region of interest.

12. The method of claim 8, wherein the original DOD and the new DOD are rectangular.

13. The method of claim 8, wherein determining the new DOD further comprises determining a forward warp using a low-resolution proxy image of the original image.

14. The method of claim 8, wherein the warping operation comprises a morphing operation.

15. A warping engine for determining a domain of definition (DOD) in a warped image, the warped image formed from an original image, each pixel of the warped image having a displacement from a corresponding pixel in the original image, the original image unrestricted by a border, the warping engine comprising:
   a warping module adapted to warp the original image; and
   a DOD module operatively coupled to the warping module, the DOD module adapted to:
      determine an original DOD associated with the original image, the original DOD comprising a region of the original image with a boundary surrounding useful information, the boundary having a plurality of edges corresponding to a plurality of directions;
      for each pixel located on the plurality of edges of the original DOD:
         determine a location of a corresponding pixel in the warped image; and
         determine a displacement of the pixel in the warped image from its corresponding pixel in the original image;
      for each of the plurality of edges, determine a maximal displacement value of a pixel on the edge in the direction corresponding to the edge; and
      determine a new DOD for the warped image, the new DOD for the warped image corresponding to a DOD in the original image, each edge of the new DOD displaced in the direction and by the determined maximal displacement value corresponding to the edge.

16. The system of claim 15 wherein the plurality of directions includes up, down, left and right.

17. The system of claim 15, wherein the warping engine is further adapted to:
   calculate a first portion of the new DOD within a first region of interest, the first region of interest comprising a viewable window of the warped image; and
   calculate a second portion of the new DOD within a second region of interest, the second portion of the new DOD residing outside of the first region of interest.

18. A warping engine for determining a domain of definition (DOD) formed as a result of a warping operation of an original image, the warping engine comprising:
   a warping module adapted to warp the original image; and
   a DOD module operatively coupled to the warping module, the DOD module adapted to:
      determine an original DOD associated with the original image, the original DOD comprising a region of the original image with a boundary surrounding useful information prior to the warping operation, the boundary having a plurality of edges corresponding to a plurality of directions, the warping operation constrained by pixels being fixed at image borders;
      determine a maximum displacement in each of the plurality of directions based on constraints for pixel repositioning in the warping operation; and
      determine a new DOD by displacing each edge of the original DOD boundary by the determined maximum displacement in the direction corresponding to each edge.

19. The system of claim 18 wherein the plurality of directions includes up, down, left and right.

20. The system of claim 18, wherein the warping engine is further adapted to:
   calculate a first portion of the new DOD within a first region of interest, the first region of interest comprising a viewable window of the warped image; and
   calculate a second portion of the new DOD within a second region of interest, the second portion of the new DOD residing outside of the first region of interest.

21. A computer readable medium storing computer for determining a domain of definition (DOD) in a warped image, the warped image formed from an original image, each pixel of the warped image having a displacement from a corresponding pixel in the original image, the original image unrestricted by a border, which when executed by a computer performs a process comprising:
   determining an original DOD associated with the original image, the original DOD comprising a region of the original image with a boundary surrounding useful information, the boundary having a plurality of edges corresponding to a plurality of directions;
   for each pixel located on the plurality of edges of the original DOD:
      determining a location of a corresponding pixel in the warped image; and
      determining a displacement of the pixel in the warped image from its corresponding pixel in the original image;
   for each of the plurality of edges, determining a maximal displacement value of a pixel on the edge in the direction corresponding to the edge; and
   determining a new DOD for the warped image, the new DOD for the warped image corresponding to a DOD in the original image, each edge of the new DOD displaced in the direction and by the determined maximal displacement value corresponding to the edge of the original DOD.

* * * * *